(12) United States Patent
Womble et al.

(10) Patent No.: US 8,026,830 B2
(45) Date of Patent: Sep. 27, 2011

(54) METHODS AND SYSTEMS FOR METER READING AND HIGH SPEED DATA TRANSFER

(75) Inventors: Phillip C. Womble, White House, TN (US); Jonathan Paschal, Bowling Green, KY (US); Dudley B. Pinson, Cumming, GA (US)

(73) Assignee: BOH Technology, L.L.C., Covington, LA (US)

( * ) Notice: Subject to any disclaimer, the term of this patent is extended or adjusted under 35 U.S.C. 154(b) by 0 days.

(21) Appl. No.: 11/211,265

(22) Filed: Aug. 25, 2005

(65) Prior Publication Data

US 2006/0044158 A1      Mar. 2, 2006

Related U.S. Application Data

(60) Provisional application No. 60/607,392, filed on Sep. 2, 2004.

(51) Int. Cl.
    *G08B 23/00* (2006.01)
(52) U.S. Cl. ......... 340/870.02; 340/870.11; 397/106.07; 709/217; 709/223
(58) Field of Classification Search ............. 340/870.02, 340/870.11; 379/106.07; 709/217
    See application file for complete search history.

(56) References Cited

U.S. PATENT DOCUMENTS

| | | | | |
|---|---|---|---|---|
| 4,489,220 A | 12/1984 | Oliver | ..................... | 179/2 AM |
| 4,682,169 A | 7/1987 | Swanson | ..................... | 379/104 |
| 4,697,181 A | 9/1987 | Swanson | ................. | 340/870.02 |
| 4,713,837 A * | 12/1987 | Gordon | ................. | 379/106.07 |
| 4,728,950 A | 3/1988 | Hendrickson et al. | ... | 340/870.31 |
| 4,804,957 A | 2/1989 | Selp et al. | ................. | 340/870.03 |
| 4,817,131 A | 3/1989 | Thornborough et al. | | |
| 5,031,209 A | 7/1991 | Thornborough et al. | ...... | 379/107 |
| 5,128,988 A | 7/1992 | Cowell et al. | ................. | 379/107 |
| 5,140,351 A | 8/1992 | Garcia et al. | | |
| 5,283,572 A | 2/1994 | McClelland et al. | .... | 340/870.02 |
| 5,377,268 A | 12/1994 | Hunter | ........................ | 380/23 |
| 5,381,462 A | 1/1995 | Larson et al. | ................. | 379/107 |
| 5,420,799 A | 5/1995 | Peterson et al. | ............. | 364/483 |
| 5,434,911 A | 7/1995 | Gray et al. | ..................... | 379/106 |
| 5,451,938 A | 9/1995 | Brennan, Jr. | | |
| 5,523,751 A | 6/1996 | Byford et al. | | |
| 5,535,267 A | 7/1996 | Schull | ........................... | 379/106 |
| 5,541,589 A | 7/1996 | Delaney | ................... | 340/870.02 |
| 5,590,179 A | 12/1996 | Shincovich et al. | ........ | 379/107 |
| 5,619,192 A | 4/1997 | Ayala | ....................... | 340/870.02 |
| 5,631,843 A | 5/1997 | Munday et al. | ............... | 364/492 |

(Continued)

OTHER PUBLICATIONS

Joe Hastreiter, AMR Expands Across the Country, Water Engineering & Management, Des Plaines: Aug. 1999. vol. 146, Iss. 8; pp. 16-20.

(Continued)

*Primary Examiner* — Timothy Edwards, Jr.
(74) *Attorney, Agent, or Firm* — Ballard Spahr LLP

(57) ABSTRACT

A secure automatic meter reading ("AMR") method and apparatus which utilizes a microprocessor and a bi-directional broadband connection to access the Internet and can form a wireless distribution network is provided. In addition to AMR, this connection and the network can provide high speed data transmission for other devices and services. As a result of the methods and apparatuses of the present inventions, legacy utility infrastructure and communications equipment can be integrated into a data transmission and collection network and remotely monitored without the costs associated with deploying service personnel or more costly equipment and services.

32 Claims, 5 Drawing Sheets

U.S. PATENT DOCUMENTS

| | | | |
|---|---|---|---|
| 5,682,422 A | 10/1997 | Oliver | 379/107 |
| 5,696,695 A | 12/1997 | Ehlers et al. | 364/492 |
| 5,699,276 A | 12/1997 | Roos | |
| 5,852,409 A | 12/1998 | Bell | 340/870.02 |
| 5,897,607 A | 4/1999 | Jenney et al. | |
| 6,295,449 B1 | 9/2001 | Westerlage et al. | 455/422 |
| 6,327,541 B1* | 12/2001 | Pitchford et al. | 702/62 |
| 6,369,719 B1 | 4/2002 | Tracy et al. | |
| 6,559,766 B2 | 5/2003 | Mohri | |
| 6,650,249 B2 | 11/2003 | Meyer et al. | |
| 6,653,945 B2 | 11/2003 | Johnson et al. | 340/870.02 |
| 6,657,552 B2 | 12/2003 | Belski et al. | |
| 6,747,571 B2 | 6/2004 | Fierro et al. | |
| 6,778,099 B1 | 8/2004 | Meyer et al. | |
| 6,836,737 B2 | 12/2004 | Petite et al. | |
| 6,885,309 B1* | 4/2005 | Van Heteren | 340/870.11 |
| 6,903,699 B2 | 6/2005 | Porter et al. | |
| 7,349,766 B2 | 3/2008 | Rodgers | |
| 7,451,019 B2 | 11/2008 | Rodgers | |
| 7,486,782 B1 | 2/2009 | Roos | |
| 2001/0038343 A1 | 11/2001 | Meyer et al. | |
| 2002/0019712 A1 | 2/2002 | Petite et al. | |
| 2002/0094799 A1 | 7/2002 | Elliott et al. | |
| 2002/0125998 A1 | 9/2002 | Petite et al. | |
| 2003/0063723 A1 | 4/2003 | Booth et al. | |
| 2003/0080876 A1 | 5/2003 | Martin | |
| 2003/0122686 A1 | 7/2003 | Ehrke et al. | |
| 2003/0128134 A1 | 7/2003 | Fierro et al. | |
| 2003/0133423 A1 | 7/2003 | Ladue | |
| 2003/0174067 A1* | 9/2003 | Soliman | 340/870.02 |
| 2004/0059585 A1 | 3/2004 | Villicana et al. | |
| 2004/0083066 A1 | 4/2004 | Hayes et al. | |
| 2004/0138981 A1* | 7/2004 | Ehlers et al. | 705/36 |
| 2004/0259523 A1 | 12/2004 | Stenger | |
| 2005/0033534 A1 | 2/2005 | Villicana et al. | |
| 2005/0043059 A1 | 2/2005 | Petite et al. | |
| 2005/0055432 A1 | 3/2005 | Rodgers | |
| 2005/0065742 A1 | 3/2005 | Rodgers | |
| 2005/0068194 A1 | 3/2005 | Schleich et al. | |
| 2005/0078631 A1 | 4/2005 | Cornwall | |
| 2005/0083235 A1 | 4/2005 | Savage et al. | |
| 2005/0162149 A1 | 7/2005 | Makinson et al. | |
| 2009/0055032 A1 | 2/2009 | Rodgers | |
| 2009/0102680 A1 | 4/2009 | Roos | |

OTHER PUBLICATIONS

Mark Rodgers, Data Unplugged: Opportunity Knocking? Public Utilities Fortnightly, Arlington: Fall 2001, p. 64, 6 pgs.

Rohr, John, SCADA and AMR Look to the Skies, Transmission & Distribution World, Overland Park: Jun. 1996, vol. 48, Iss. 6; p. 44, pp. 44-49.

Anonymous, Albany Water, Gas & Light to Use Mobile AMR for All Meters, Transmission & Distribution World, Overland Park: Sep. 2003, vol. 55, Iss. 9, p. 16.

Gaw et al., The Internet Solution: AMR Reborn, Public Utilities Fortnightly, Arlington: Oct. 1, 1999, vol. 137, Iss. 18, pp. 49-51.

Robert L. Reis, Wireless Meter Reading Fills the Bill, Communications New, Nokomis: Feb. 2000, vol. 37, Iss. 2, pp. 64-65.

Randy Southerland, The Shift is on to Automated Meter Reading, The American City & County, Pittsfield: May 15, 2000, vol. 115, Iss. 7; pp. 8-9.

Anonymous, Alabama Power Begins Trial of 500 AMDS Meter, Transmission & Distribution World, Overland Park: Feb. 2005, vol. 57, Iss. 2, p. 14.

Anonymous, ABB Unveils Two-Way Wireless AMR, Transmission & Distribution World. Overland Park: Dec. 1998. vol. 50, Iss. 13: p. 6.

Anonymous, Wireless Electricity Metering System, Transmission & Distribution World, Overland Park: Jan. 1998, vol. 50, Iss. 1, p. 10.

Gavirneni et al., Schlumberger Optimizes Receiver Location for Automated Meter Reading, Interfaces, Linthicum: May/Jun. 2004, vol. 34, Iss. 3, pp. 208-214.

Wacks, K.P., "The Impact of Home Automation on Power Electronics," APEC, Mar. 1993, (Abstract).

* cited by examiner

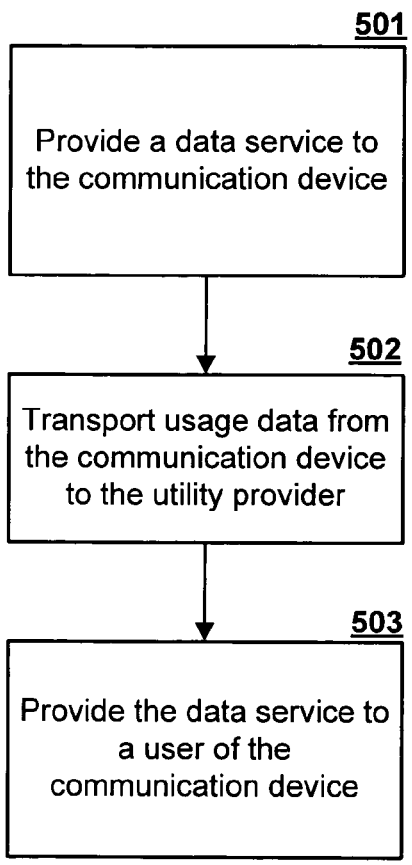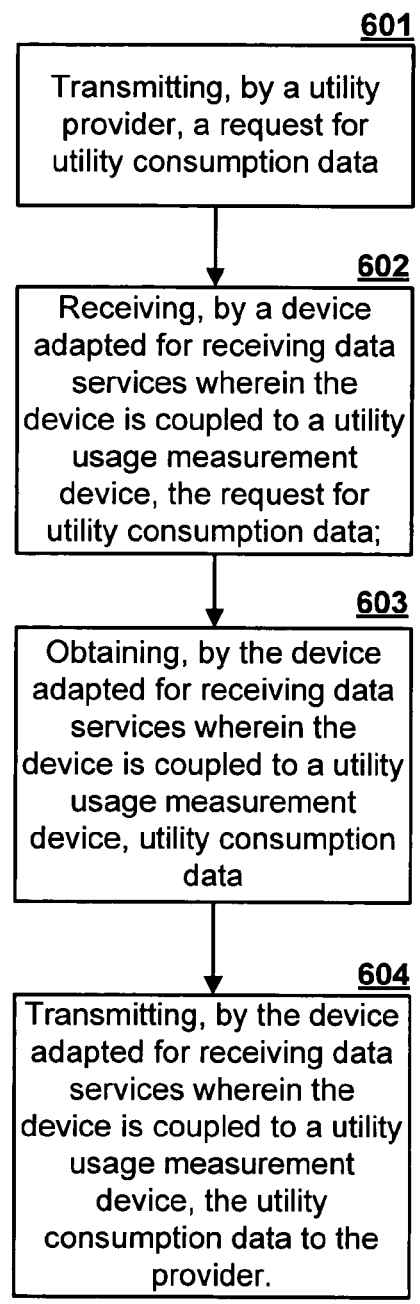

METHODS AND SYSTEMS FOR METER READING AND HIGH SPEED DATA TRANSFER

RELATED APPLICATIONS

This application claims priority to U.S. Provisional Patent Application No. 60/607,392, filed on Sep. 2, 2004, herein incorporated by reference in its entirety.

BACKGROUND OF THE INVENTION

Monitoring the residential, commercial, and industrial complexes of buildings throughout the United States are a variety of user equipment. Examples of such user equipment include meter reading devices that measure consumption of various utility commodities such as natural gas, electricity and water via an electrical or electro-mechanical transducer. The meter reading devices are typically analog devices that record either a first reading, or a second reading of the measured commodity over a period of time, or, alternatively, a cycling total (that is, a running total that recycles after a certain number is reached).

Generally, service personnel for the utility provided physically appear at or near the meter reading device to record consumption of the commodity each month. The recorded consumption from the meter reading device is then fed into a database used for billing purposes which in turn generates an invoice for the consumer based on user's consumption of the measured commodity.

In urban areas, the number of meter reading devices that need to be recorded is tremendous. Although the overhead associated with sending service personal to a desired location can be amortized by consolidation of meter reading devices at a particular location, for example, in a high-density residential development such as an apartment complex, the cost can still be significant. In rural areas, however, the cost is higher as meter reading cannot generally be amortized over a number of meter reading devices read at a single location.

Various techniques are employed by utility companies to reduce the cost of sending service personal to a physical site. For example, a simple method is the use of stochastic techniques for extrapolating a measured quantity for a current reading from one or more past values or a moving or seasonal average. This technique is designed to reduce the frequency of meter reading. A disadvantage, however, is the fact that the extrapolated reading can be greatly under or over the actual consumption, such as the case where a consumer is simply not present and no services are used, or when an unusual weather pattern occurs and consumption is significantly increased.

Another technique is the use of radio-based meter reading devices. For example, each meter reading device includes a radio, the radio capable of broadcasting a meter reading to a nearby receiver. In the Middle East for example, such a system is often employed because service personnel are frequently denied access to a property when the property owner (a man) is not home. The radio based meter reading devices allow service personnel to drive near the radio meter reading device with a receiver device to read the meter. With such technology service personnel do not need to enter the property. An advantage of such a system is that, in rural areas, the time it takes service personnel to read the meters can be reduced.

For example, one system might require service personnel to physically drive by or near a collection of meter reading devices in order to communicate with the devices. The data collected in the "drive-by" would be later uploaded to a centralized data collection system.

Another solution can include periodic stations that collect wireless data from the devices. The periodic stations, in turn could include a landline modem that communicates with the centralized data collection system by way of circuit switched calls. Such a solution offers an alternative to deploying service personnel, however, setting up phone lines to service the periodic stations can also be expensive. Moreover, circuit switched calls can also be expensive.

The problems mentioned above are exacerbated by deregulation of the utilities industry in the United States. It is now possible for several different suppliers of electricity to service a single metropolitan area. This, in turn, results in a non-contiguous patchwork of service areas that service personnel may have to monitor. No longer can it be assumed that all users in a particular geographic area receive electrical power from a single service provider. Indeed, on a single residential block many households may have different service providers. Moreover, the alleged ease with which a consumer may switch service providers further complicates the circumstance. Accordingly, the ability to amortize the costs of collecting usage measurements is reduced.

SUMMARY OF THE INVENTION

A data collection system for transmitting data from user equipment to a user application server over the Internet. According to an aspect of the invention, a high speed data connection is established at the terminal apparatus which is linked to the communications network. This high speed data connection is achieved either wirelessly using commercially available radios communicating with a wireless bridge, or by having cable, wire, or fiber optic lines connecting directly to the terminal apparatus.

According to embodiments described herein, an Internet link is established with the electric meter via a commercially available wireless radio transmitter. The radio is connected to the data collection processor on the meter and can be used to report usage information or monitor power consumption. As a result of the methods and apparatuses of the present invention, existing serial communications equipment can be integrated into a data collection network and remotely monitored without the costs associated with deploying service personnel or costly circuit switched or signal injection type equipment and services.

Additionally, as a result of integrating a wireless radio into the meter which is linked to the Internet, a wireless access point or WI-FI "hotspot" is established at each meter location which can be used to provide other services such as high-speed Internet, Internet Phone, video, and other RF applications and services.

Additional advantages of the invention will be set forth in part in the description which follows, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodi

FIG. 5 is a flowchart illustrating an exemplary implementation of a disclosed method for providing data services.

FIG. 6 is a flowchart illustrating an exemplary implementation of a disclosed method for utility consumption measurement.

DETAILED DESCRIPTION OF THE INVENTION

Figure 1:
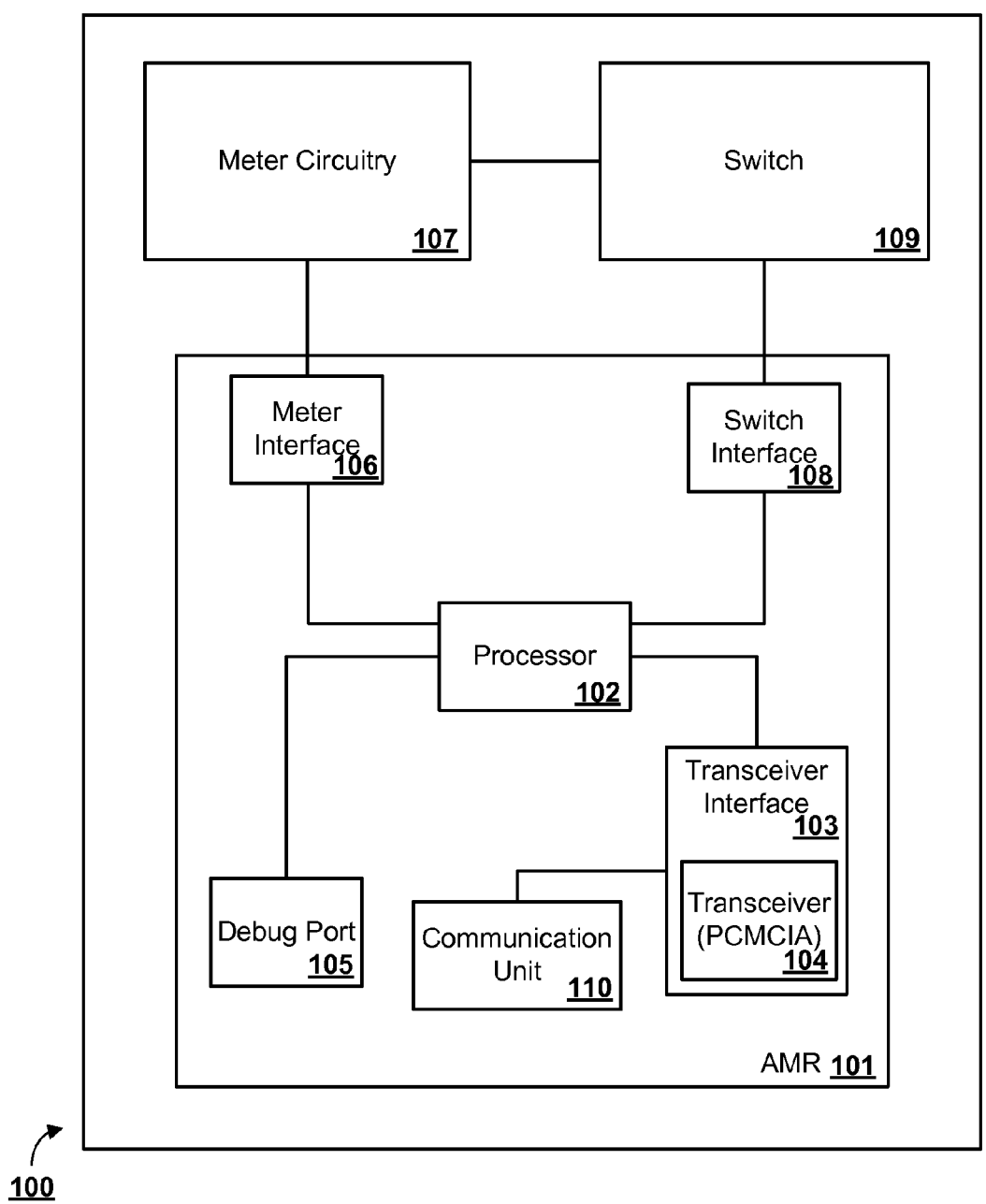
- FIG. 1 is a block diagram illustrating an exemplary device capable of implementing the disclosed methods.

Before the present methods and systems are disclosed and described, it is to be understood that this invention is not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Thus, for example, reference to "a meter" includes mixtures of meters, reference to "a meter" includes mixtures of two or more such meters, and the like.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

A method and apparatus for data transfer is provided. According to an aspect of the invention, a communications bridge (or access point) is provided that reads a data collection device and transmits the data to a provider server via the Internet. As used herein, a "provider" can refer to a data services provider, such as an Internet Service Provider (ISP), a television (cable) provider, a Voice over Internet Protocol (VoIP) provider, a home/business security system provider, and the like. "Providing" is also used to refer to the sending, receiving, or both of said data services between electronic components and to an end user. An end user can include an ISP, VoIP, television, or security system customer. The present invention is not limited to providing data services to home or office users, but rather, can include providing data services to any location capable of supporting a device of the present invention. Such locations include areas near billboards, street lights, and the like. In one embodiment, the present invention can provide data service (for example, VoIP, Internet, television, and the like) to consumers on highways, streets, urban environments and the like. Further, it is not necessary to practice the present invention in conjunction with utility measuring equipment, rather, the present invention can act as a stand-alone device for providing data services.

According to one embodiment of the present inventions, the communications bridge is implemented by way of specially configured wireless electrical hardware and software. However, according to another embodiment, the communications bridge is implemented by way of direct connection to the Internet via a wired connection such as fiber optic line.

The present invention may be understood more readily by reference to the following detailed description of preferred embodiments of the invention and the examples included therein and to the Figures and their previous and following description.

FIG. 1 is a block diagram of an embodiment of an apparatus capable of performing the disclosed methods. Utility measuring equipment (also referred to as utility usage measurement devices), such as a digital utility meter 100, can be connected to an automatic meter reading (AMR) device 101. The digital utility meter 100 can be, for example, a power meter, a gas meter, or a water meter. Utility measuring equipment can also be, for example, telemetry equipment, meter reader concentration point, utility meter control system, home network control system, substation monitoring equipment, and the like. The utility measuring equipment can be configured to collect measured data, utility consumption data that monitors external activity. The utility measuring equipment can be used in conjunction with an event detection and notification application, such as a fire alarm, gas alarm, burglar alarm, vending machine alarm, or another condition indicating a change of state of the user equipment, or some other device connected thereto.

The meter circuitry 107 of digital utility meter 100 can be coupled to the AMR 101 via a meter interface 106. This coupling can be made, for example, by a serial peripheral interface (SPI). An SPI is an interface that enables the serial (one bit at a time) exchange of data between two devices. An SPI can operate in full duplex mode. Data can be transferred in both directions at the same time. SPI is most often employed in systems for communication between a processor 102, and peripheral devices. Multiple processors can also be connected by means of SPI. The meter interface 106 is coupled to the processor 102. The processor 102 can be any special purpose or general purpose processor capable of executing instructions contained in software. A processor can be a microcontroller, an integrated chip that contains all the components comprising a controller. Typically, this includes a CPU, RAM, some form of ROM, I/O ports, and timers. Unlike a general-purpose computer, which also includes all of these components, a microcontroller is designed for a very specific task—to control a particular system. Microcontrollers are also referred to as embedded microcontrollers.

The processor 102 can be a hardware component that includes a software driver. The processor 102 can have a dedicated piece of hardware that executes a software driver, however, it is also possible for the software driver to be overlaid into an existing piece of hardware as an additional component of a software stack. For example, a processor driver can be added to the utility measuring equipment software stack or to a wireless transceiver 104 software stack. The processor driver is generally an interrupt driven service routine that first identifies the source of an interrupt and second determines what process or interrupt service routine to execute based on any of the data accompanying the interrupt (or the interrupt itself). Incoming data from can be serial ASCII character data. Commands can be based on the well-known Hayes modem AT Command set, although additional special codes can be added to identify particular functionality described herein.

According to one embodiment, the primary components of the processor driver are saved in non-volatile memory and are executed by the processor 102 as a sequence of instructions stored in a computer-readable format. For example, a sequence of instructions (e.g., op codes) are loaded into data and control registers within the processor 102 from non-volatile memory (alternatively, the instructions can be copied from non-volatile memory to a volatile execution memory before being executed). The sequences of instructions cause the processor 102 to perform a series of acts based upon a combination of the sequences of instructions and the data received. Program variables needed by the processor driver are either stored in available registers internal to the processor 102, or they are stored in volatile memory.

A switch 109 can be coupled to the AMR 101 and to the meter circuitry 107. The switch 109 can be, a Gruner Relay Switch model number 17A-4025-240, a BLP switch model number 36-101-501-384 or similar. The switch 109, can be coupled to the AMR 101 via a switch interface 108. The coupling can be via a GPIO (General Purpose Input/Output), or Bus Expander, to allow serial expansion of I/O through an I2C, SMBus, or SPI interface. GPIO can provide additional control and monitoring when a microcontroller or chipset has insufficient I/O ports, ad in systems where serial communication and control from a remote location is advantageous. The switch interface 108 is coupled to the microcontroller 102. The switch 109 is also coupled to the meter circuitry 107. This coupling allows the switch 109 to change the utility provided through the meter from on to off and from off to on. This change in on/off status can be initiated after receiving a request to do so from the microcontroller 102. The switch 109 allows a provider 205 to connect and disconnect a utility remotely through the Internet 204 without having to send a technician to the premises.

The AMR 101 can further comprise a transceiver interface 103 for connecting a transceiver 104 to the AMR 101. The transceiver interface 103 can be, for example, a serial port, a PCMCIA port, a USB port, and the like. The transceiver 104 can be any electronic circuit designed to transmit and receive data over a network. Such transmission and reception can be made via a wired network, such as cable and fiber optic lines, or via a wireless network, such as RF, infrared, and the like. The transceiver 104 can be contained in a PCMCIA radio device or other wireless card that plugs into transceiver interface 103. Thus, as wireless technology advances, the meter 100 can be easily upgraded to achieve higher throughput speeds and provide more services by simply replacing the card. Existing 802.11 radios operating at a frequency of 2.4 GHz and having speeds of 100 Mbps can be used to provide most home RF services. The transceiver 104 can alternatively be connected directly to the processor 102.

The AMR 101 can also have a debug port 105. The debug port 105 can be an open serial interface capable of receiving a terminal or test equipment for debugging and configuration purposes. The debug port services could alternatively be accessed through the meter interface 106 or the switch interface 108.

The AMR 101 can optionally comprise a communication unit 110. The communication unit 110 can be coupled to the processor 102. The communication unit 110 can be any electronic circuit designed to transmit and receive data over a network. Such transmission and reception can be made via a wired network, such as cable and fiber optic lines. The communication unit 110 can be an Internet communication device adapted to send and receive data services such as high-speed Internet access, VOIP, television, security services, and the like. The communication unit 110 can provide the data services to the transceiver 104, whereby the transceiver 104 can provide the data services wirelessly to an end user.

Figure 2:
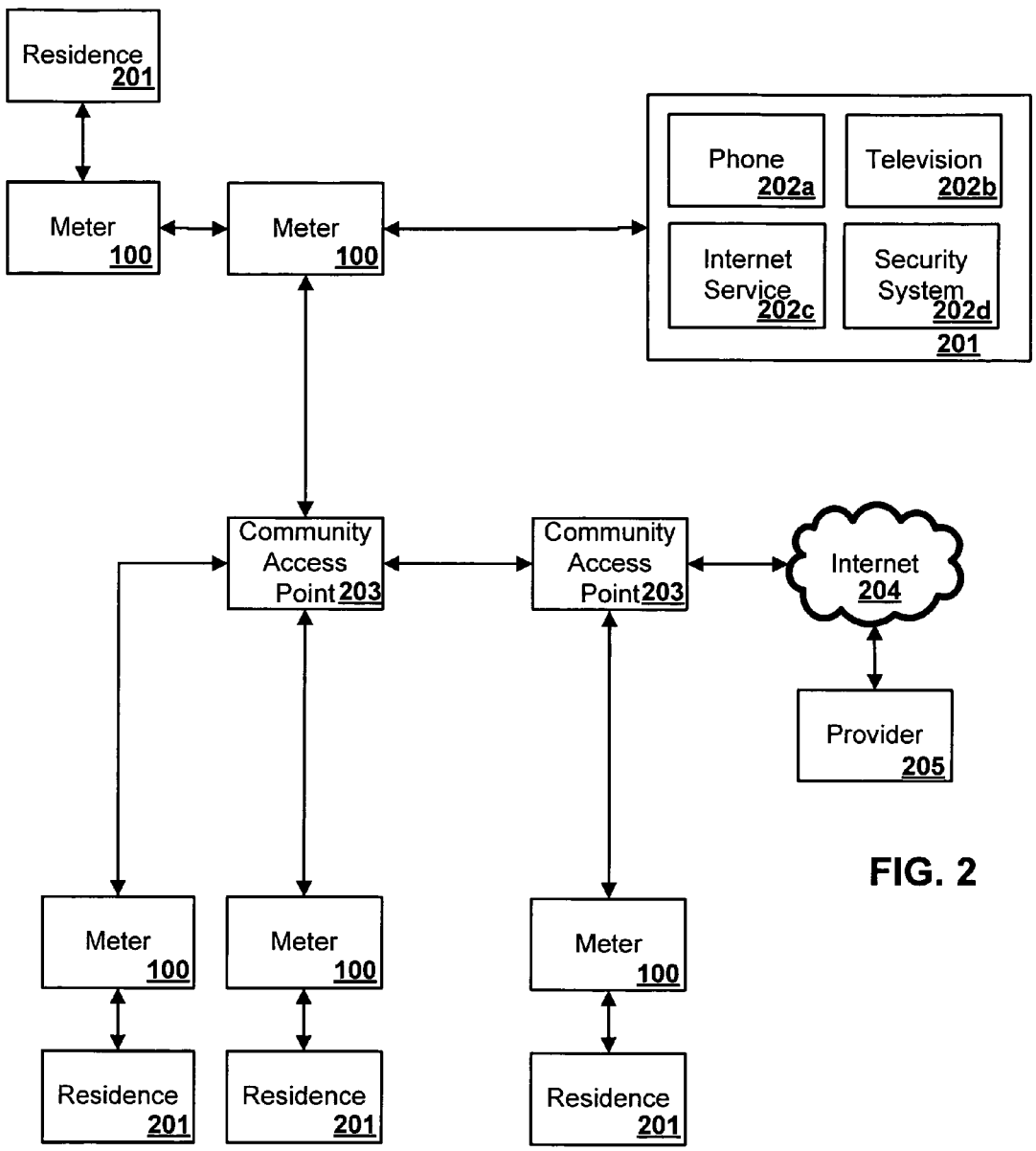
FIG. 2 is a block diagram of a system implementing the disclosed devices and methods.

FIG. 2 is a block diagram illustrating an exemplary system in which the digital utility meter 100, containing an AMR 101, can be used to implement the method of the invention. This exemplary system is only an example of a system and is not intended to suggest any limitation as to the scope of use or functionality of system architecture. Neither should the system be interpreted as having any dependency or requirement relating to any one or combination of components illustrated in the exemplary system.

The AMR 101 can collect usage data and transmit the same to a provider 205 on demand or at any programmed interval the provider 205 requires. The provider 205 can be any entity in the position of providing services to remote users. For example, a provider 205 can be a power company, water company, gas company, cable/satellite television company, phone company, security company, and the like. The data can be transmitted to the Internet 204, for transport to the provider 205, through a fiber optic line or other wire connected to the AMR 101, if available. If fiber or other communication lines are not available to the AMR 101, the AMR 101 can communicate to the Internet 204 wirelessly through a nearby community access point 203. A community access point 203 can be, for example, a wireless bridge or router that is connected to fiber or other wire. This creates a two way communication link to the AMR 101. The community access point 203 can be located at the street in front of a residence 201 and mounted on a streetlight, utility pole or box or other suitable location.

The community access point 203 can collect data from one or several meters within its range. The community access point 203 can be a standard commercial grade bridge or router as manufactured by Cisco Systems, Inc. and others. A NEMA 4 enclosure or equal would protect the components from exposure to the elements. These components are currently used to establish enterprise Wi-Fi networks for commercial and government installations. They have been designed and tested for environmental considerations, and have the necessary speed to provide the initial services envisioned. Community access points 203 using the 802.11 wireless standards with a minimum speed of 100 Mbps will be sufficient to provide most home RF services. The community access point 203 can be powered by electrical service at the street and can be connected to fiber optic or other wire if available.

If data from one meter 100 cannot reach a community access point 203, the data can be wirelessly directed to another nearby meter 100 for transmission to a community access point 203 forming a mesh network of meters and community access points 203 which provides redundancy in the system. If a community access point 203 is not connected directly to fiber optic or other wire, the data can be transmitted from one community access point 203 to another to form a "daisy-chain" until it reaches a community access point 203 that is connected to fiber or other transmission media.

Figure 3:
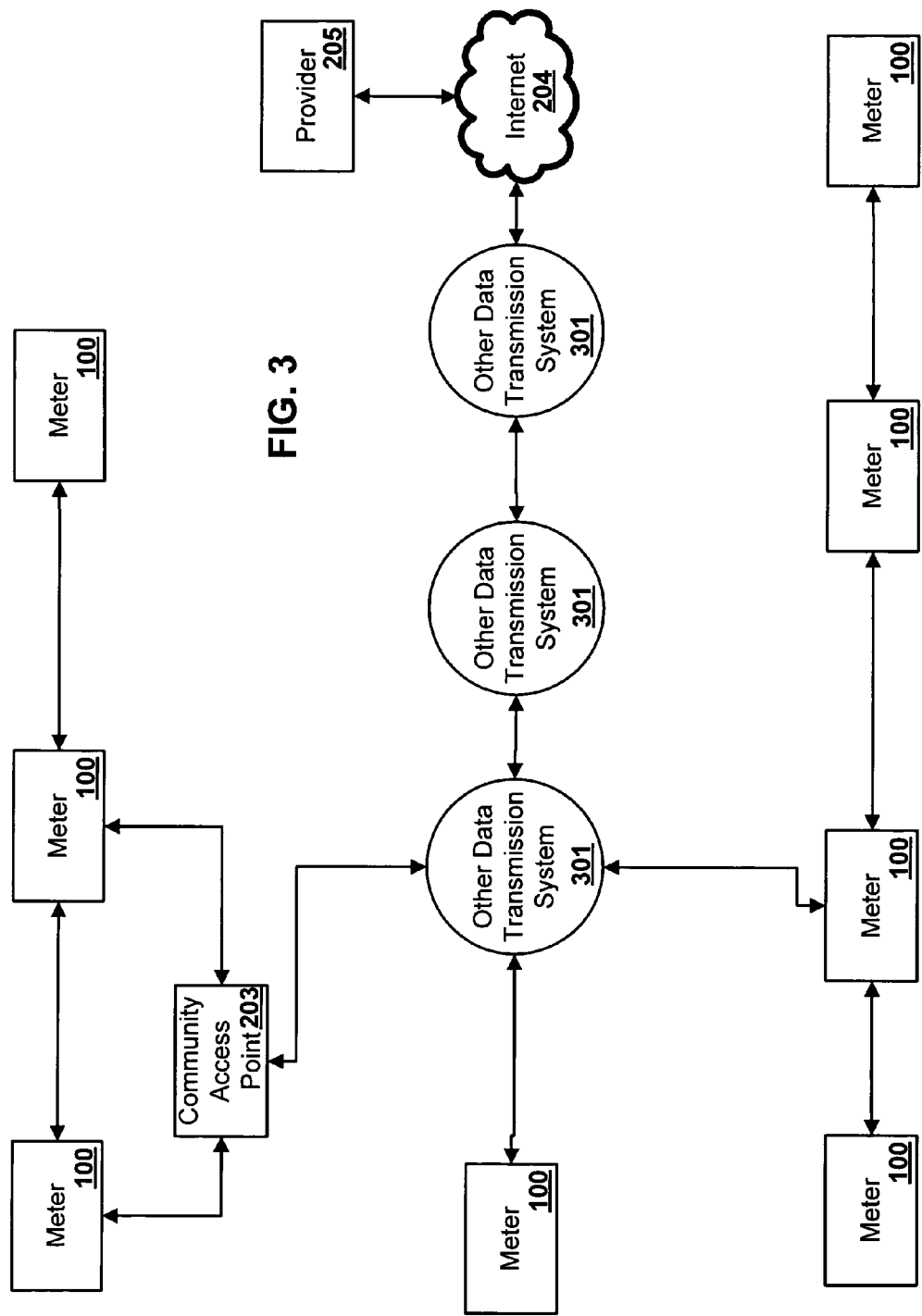
FIG. 3 is a block diagram a system implementing the disclosed devices and methods forming a wireless mesh network.

As shown in FIG. 3, for providing meter reading capability and providing data services, for example, from provider 205, over longer distances between fiber optic or other wire connections to the Internet 204 and for rural applications, the community access point 203 can be linked to other data transmission systems 301, such as microwave, laser, satellite, etc. until a fiber optic or other Internet 204 connection can be reached. The data can be transmitted down utility transmission corridors such as electric, gas, waterline and other utility easements.

Once a communication link has been established between the AMR 101 and the Internet 204, the AMR 101 can then serve as a wireless access point to provide WI-FI to the residence 201. This can be used to provide a variety of data services such as, Internet phone service 202a, television/ video services 202b, high-speed Internet service 202c, home security service 202d, and other Home RF applications. These data services can be provided wirelessly. Using a standards based transceiver 104 in the AMR 101, such as 802.11, provides compatibility with commercial products currently being manufactured such as phones, computers, etc. Security can be provided through encryption and/or by programming each AMR 101 to become a Virtual Private Network (VPN). Each AMR 101 can be issued an IP address and can be programmed and identified individually. This enables the provider 205 to communicate with each individual AMR 101 to provide specific services.

Figure 4:
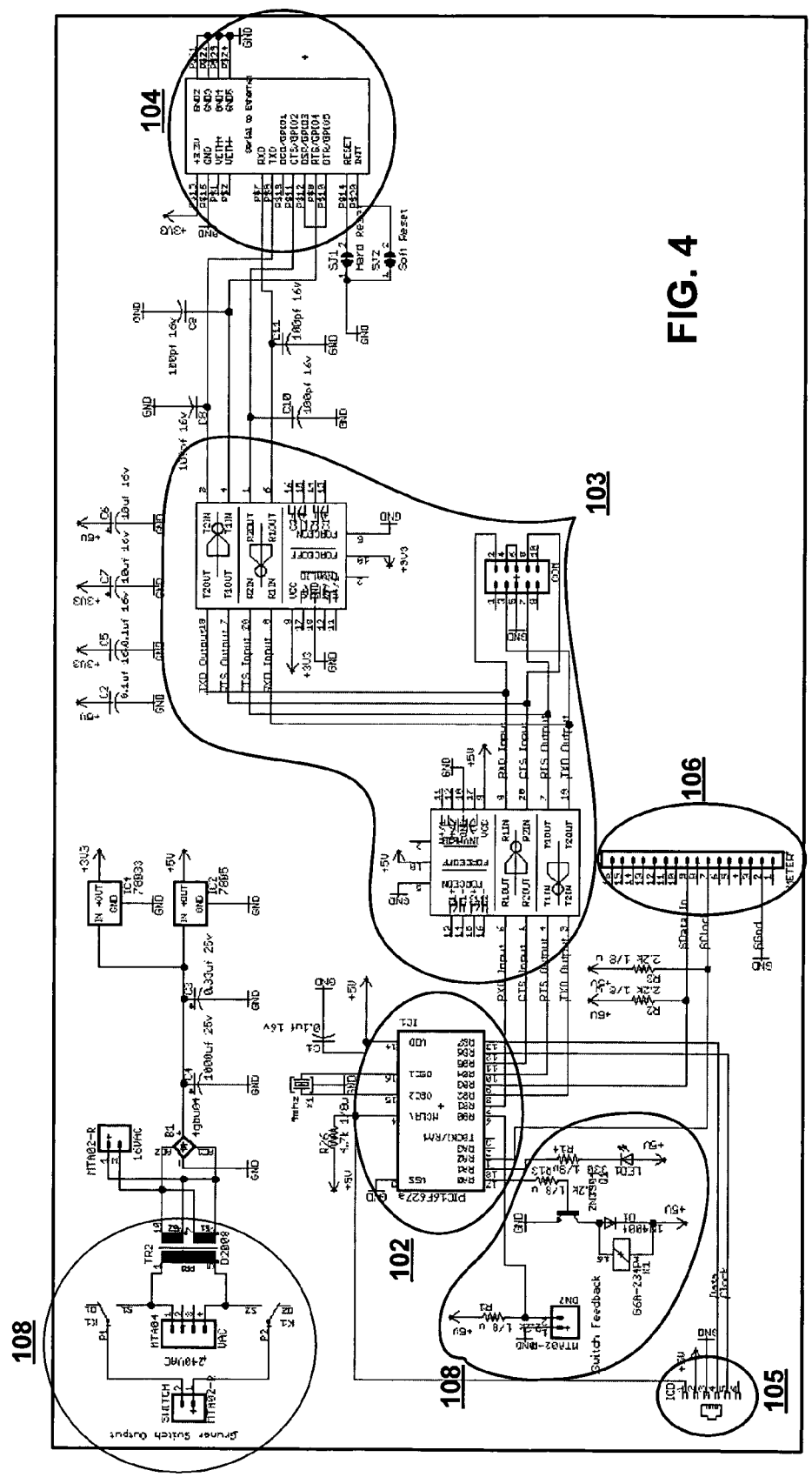
FIG. 4 is a detailed electrical schematic of an exemplary implementation of the device of the present invention.

FIG. 4 is a detailed electrical schematic of an exemplary implementation of a device of the present invention with the components corresponding to FIG. 1 indicated. The processor 102 can be a PIC microprocessor. The transceiver interface 103 can be a MAX-232. The transceiver (ethernet) can be a Digi Connect ME or Asus WL-330. The switch (not shown) can be a BLP switch or a Gruner switch, connected via a switch interface 108 (two parts of the switch interface 108 are indicated on FIG. 4). The debug port 105 can be an open serial interface. The meter interface 106 can be a serial peripheral interface. An example of a meter in which these components can be coupled is a Sensus iCon Meter.

FIG. 5 illustrates steps in an exemplary method for providing data services using an exemplary device of the present invention, such as AMR 101. The method relates generally for providing data services. More specifically, the method relates to providing data services to a communication device coupled to a utility usage measurement device, the utility usage measurement device adapted to measure the usage of utility service provided by a utility provider. The method can comprise providing a data service to the communication device, block 501. The method can further comprise transporting usage data from the communication device to the utility provider, block 502. The method can further comprise providing the data service to a user of the communication device, block 503. At block 503 the exemplary device of the present invention can be adapted for providing data services wirelessly to an end user. The data services can include high-speed Internet access, Internet phone service, television service, and security system service. The steps are capable of being performed in any order.

FIG. 6 illustrates steps in an exemplary method for utility consumption measurement using an exemplary device of the present invention, such as AMR 101. The method can comprise, at block 601, transmitting, by a utility provider, a request for utility consumption data. At block 602, a device adapted for receiving data services wherein the device is coupled to a utility usage measurement device can receive the request for utility consumption data. At block 603, the device adapted for receiving data services wherein the device is coupled to a utility usage measurement device, can obtain the utility consumption data from the utility usage measurement device (or alternatively from a memory unit storing the utility consumption data). Then at block 604, the device adapted for receiving data services wherein the device is coupled to a utility usage measurement device, can transmit the utility consumption data to the utility provider. The utility consumption data can be transmitted periodically. The utility consumption data can be, for example, power usage data, water usage data, or gas usage data. The steps are capable of being performed in any order.

The methods disclosed can be operational with numerous other general purpose or special purpose computing system environments or configurations. Examples of well known computing systems, environments, and/or configurations that may be suitable for use with the system and method include, but are not limited to, personal computers, server computers, laptop devices, and multiprocessor systems. Additional examples include set top boxes, programmable consumer electronics, network PCs, minicomputers, mainframe computers, distributed computing environments that include any of the above systems or devices, and the like.

While this invention has been described in connection with preferred embodiments and specific examples, it is not intended that the scope of the invention be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An automatic meter reading device, comprising:
   a processor adapted to receive utility usage data from a utility usage measurement device;
   a meter interface, coupled to the processor, adapted to interface with the utility usage measurement device and provide the utility usage data to the processor;
   a communication unit coupled to the processor and to a wired network, wherein said communication unit is adapted to receive data services, send the utility usage data and provide the data services via said wired network; and
   a transceiver unit coupled to the communication unit, wherein the transceiver unit is adapted to receive the data services from the communication unit and provide the data services wirelessly to an end user device, and wherein said transceiver unit is configured to send the utility usage data through a path to a provider via the Internet, wherein the path comprises wireless delivery of the utility usage data directly to at least one other automatic meter reading device or directly to a community access point, wherein the transceiver unit is configured to receive second utility usage data from a second automatic meter reading device and send the second utility usage data through the path to the provider, wherein the second automatic meter reading device is linked to a second residence different from a residence linked to the automatic meter reading device, and wherein the data services comprise at least one of high-speed internet access, Internet phone service, or television service.

2. The device of claim 1, further comprising:
a memory unit, coupled to the processor, adapted to store the utility usage data.

3. The device of claim 1, further comprising:
a switch, coupled to the processor and the utility usage measurement device, adapted to turn on and off a utility.

4. The device of claim 1, further comprising:
an interface for performing diagnostic and configuration functions on the device.

5. The device of claim 1 wherein the communication unit is an Internet communication device.

6. The device of claim 1 wherein the transceiver unit is an Internet communication device.

7. The device of claim 1 wherein the transceiver unit is a Personal Computer Memory Card International Association (PCMCIA radio device.

8. The device of claim 1 wherein the utility usage measurement device is a power meter.

9. The device of claim 1 wherein the utility usage measurement device is a water meter.

10. The device of claim 1 wherein the utility usage measurement device is a gas meter.

11. The device of claim 1 wherein the data services further comprise security system service.

12. The device of claim 1, wherein the transceiver unit further configured to send the utility usage data over the wired network via the communication unit.

13. The device of claim 1, wherein the community access point collects data from one or more automatic meter reading devices within its range, and wherein the community access point is located outside at least one residence linked to one of the one or more automatic meter reading devices.

14. An automatic meter reading device, comprising:
a processor, coupled to a utility usage measurement device, the processor adapted to receive utility usage data from the utility usage measurement device; and
a transceiver unit, coupled to the processor, the transceiver unit adapted to wireles sly receive data services directly from one of a first plurality of automatic meter reading devices or directly from a community access point, and wherein said transceiver unit is configured to send the utility usage data through a path to a provider via the Internet, wherein the path comprises wireless delivery of the utility usage data directly to at least one automatic meter reading device of a second plurality of automatic meter reading devices or directly to the community access point and wherein the at least one automatic meter reading device is linked to at least one residence different from a residence linked to the automatic meter reading device, and further wherein the transceiver unit provides the data services wirelessly to an end user device,
wherein the data services comprise at least one of high-speed internet access, Internet phone service, or television service.

15. The device of claim 14, further comprising:
a memory unit, coupled to the processor, adapted to store the utility usage data.

16. The device of claim 14, further comprising:
a switch, coupled to the processor and the utility usage measurement device, adapted to turn on and off a utility.

17. The device of claim 14, further comprising:
an interface for performing diagnostic and configuration functions on the device.

18. The device of claim 14 wherein the transceiver unit is an Internet communication device.

19. The device of claim 14 wherein the transceiver unit is a Personal Computer Memory Card International Association (PCMCIA) radio device.

20. The device of claim 14 wherein the utility usage measurement device is a power meter.

21. The device of claim 14 wherein the utility usage measurement device is a water meter.

22. The device of claim 14 wherein the utility usage measurement device is a gas meter.

23. The device of claim 14 wherein the data services further comprise security system service.

24. The device of claim 14, wherein the transceiver unit further adapted to receive said data services via a communication unit operably connected with said transceiver unit and with a wired wide area network.

25. The device of claim 14, wherein said transceiver unit is further configured to send the utility usage data over the wired wide area network via the communication unit.

26. A method, comprising:
providing a data service to the first automatic meter reading device coupled to a utility usage measurement device, the utility usage measurement device adapted to measure the usage of utility service provided by a utility provider;
transporting usage data from the first automatic meter reading device to the utility provider, wherein said first automatic meter reading device is configured to provide the usage data through a path to the utility provider via the Internet, wherein the path comprises delivery of the usage data through a wireless mesh network formed by a plurality of automatic meter reading devices comprising the first automatic meter reading device and a plurality of community access points; and
wirelessly providing by a transceiver coupled to the first automatic meter reading device the data service to a user of the first automatic meter reading device,
wherein the data services comprises at least one of high-speed internet access, Internet phone service, or television service.

27. The method of claim 26 wherein the data service further comprises security system service.

28. The device of claim 8, wherein the wired network comprises at least a portion of an electrical system connected to the power meter.

29. The device of claim 20, wherein the wired network comprises at least a portion of an electrical system connected to the power meter.

30. The method of claim 26, wherein the first automatic meter reading device comprises a power meter and providing the data service to the first automatic meter reading device comprises providing the data services to the power meter through at least a portion of an electrical system connected to the power meter.

31. The method of claim 26, wherein the path further comprises delivery of the usage data through a wired wide area network.

32. The method of claim 31, wherein the path further comprises wireless delivery of the usage data through a community access point.

* * * * *